2 Sheets—Sheet 1.

W. EDRIS.
GRAIN SEPARATOR.

No. 188,345

Patented March 13, 1877.

WITNESSES:

INVENTOR:
Wm Edris
BY
ATTORNEYS.

2 Sheets—Sheet 2.

W. EDRIS.
GRAIN SEPARATOR.

No. 188,345. Patented March 13, 1877.

WITNESSES:
Solon C. Kemon
Chas. A. Pettit

INVENTOR:
Wm. Edris
BY
Munn & Co.
ATTORNEYS.

UNITED STATES PATENT OFFICE.

WILLIAM EDRIS, OF EUGENE CITY, OREGON.

IMPROVEMENT IN GRAIN-SEPARATORS.

Specification forming part of Letters Patent No. 188,345, dated March 13, 1877; application filed February 10, 1877.

*To all whom it may concern:*

Be it known that I, WILLIAM EDRIS, of Eugene City, in the county of Lane and State of Oregon, have invented a new and Improved Wheat Separator and Cleaner; and I do hereby declare that the following is a full, clear, and exact description of the same, reference being had to the accompanying drawing, forming a part of this specification, in which—

Figure 1:
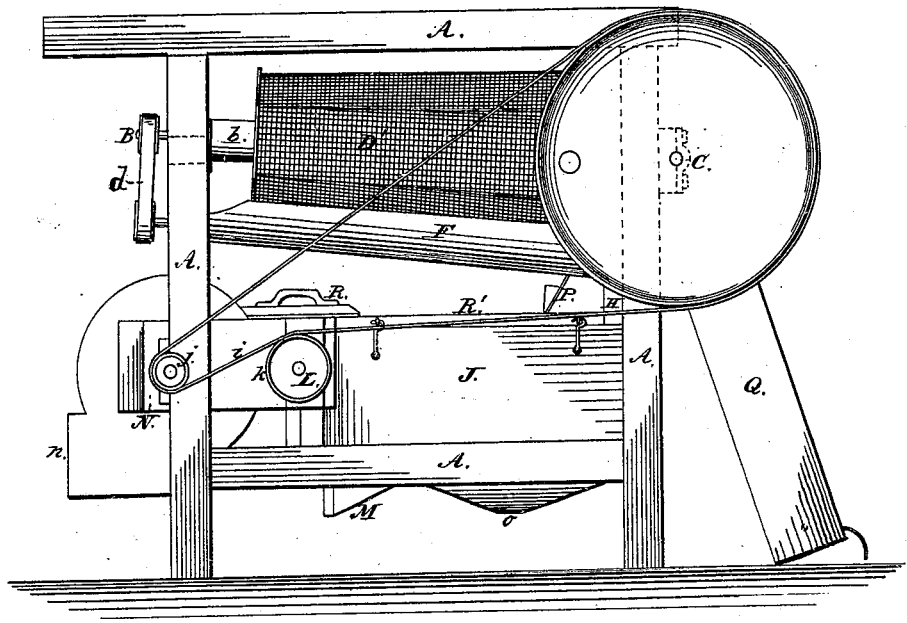
Figure 2:
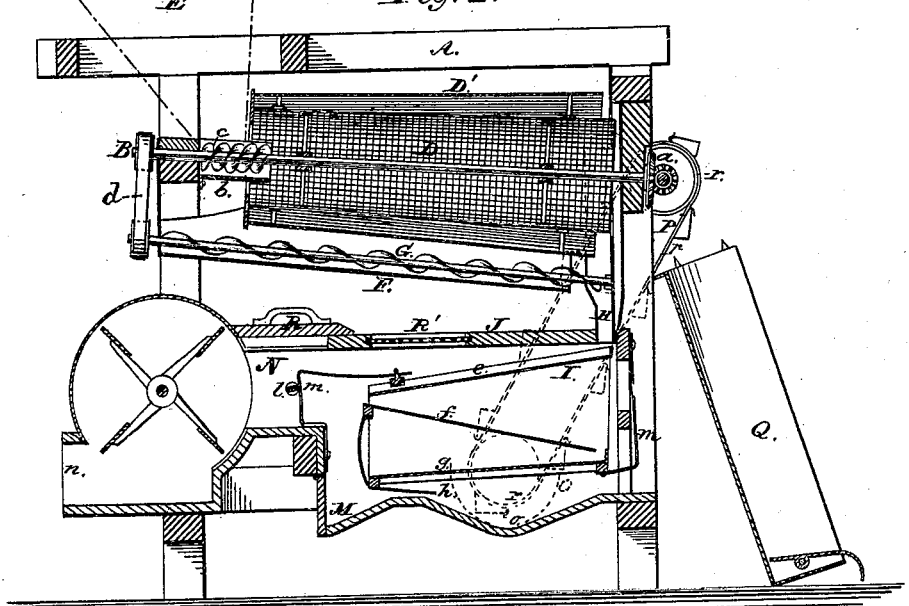
Figure 3:
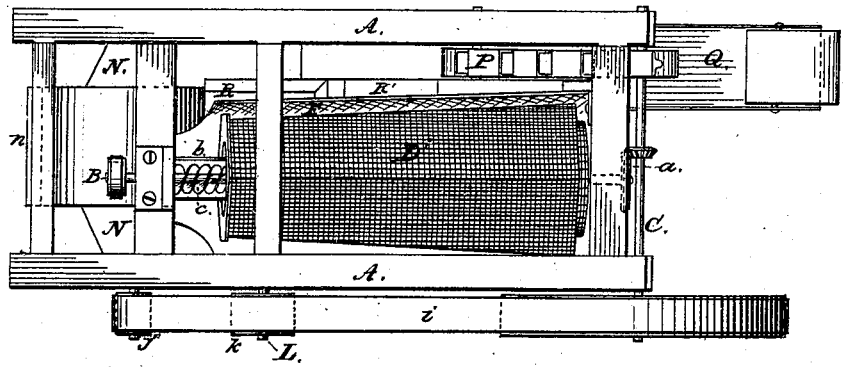
Figure 4:
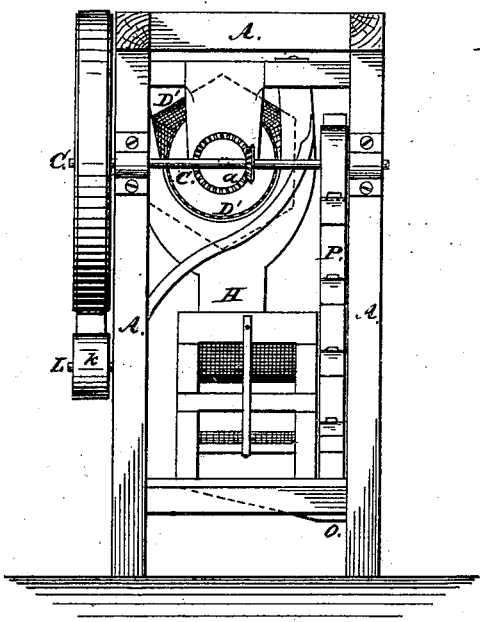
Figure 5:
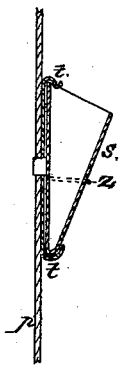

Figure 1 is a side elevation; Fig. 2, a vertical longitudinal section; Fig. 3, a plan view; Fig. 4, an end view; Fig. 5, a sectional detail of one of the buckets of the elevator-belt.

My invention relates to certain improvements in that class of grain-separators which are used for cleaning wheat of the commingled chaff, oats, and imperfect grains, and separating also the garlic, cockle, smut, and other small impurities which may be mixed therewith. It consists in the particular construction of the device, as hereinafter claimed, in which a rectangular frame carries, near the top and just below a hopper, a revolving screen or reel, to which the wheat is fed by a spiral conveyer. The said reel is made double, with the outer portion provided with small perforations, and the inner portion of woven wire with large meshes, so that the wheat which drops from the conveyer into the reel passes through the woven wire, between the two portions of the reel, to the shaker-sieves below, the larger impurities passing out of the end of the inner reel without going through it, and the fine cockle and impurities, passing through both portions of the reel, and falling into a subjacent trough, are carried away by a spiral conveyer. The partially-clean wheat passes then upon a subjacent reciprocating set of shaker-sieves, which, in combination with a suction-fan, completes the cleaning of the wheat, and the grain is delivered into a box, from whence it is taken by the elevator and delivered to the bag.

In the drawing, A represents an upright rectangular frame, in the upper portion of which is journaled an inclined shaft, B, rotated through a bevel-gear, a, by the driving-shaft C. Upon the shaft B is constructed an inner reel, D, of woven wire, having meshes of a size to admit the passage of the wheat therethrough, but small enough to exclude portions of wheat-heads, stems, dirt, oat-grains, &c. Outside this inner reel is constructed a second reel or polygonal screen, D', made of sheet metal stamped with perforations of a size too small to allow the passage of the perfect wheat-grains, but large enough to allow the small imperfect grains of wheat, together with the cockle and garlic, to pass through.

The outer reel is made smaller at its feed end, so that in its rotation the grain passes, from the action of gravity, lengthwise through the same. E is the hopper into which the grain is poured. This hopper is located upon the top of the machine, and delivers its grain at the bottom into a short trough, b, in which revolves a spiral conveyer, c, formed on the reel-shaft B. This conveyer serves to regulate the flow of grain to the inside of the reel, and prevents clogging when the grain is very much mixed with chaff and other impurities, as when it first comes from the thrasher. As the wheat passes into the reels D D' the perfect grains, with the small impurities, pass through D, leaving the parts of wheat-heads, pieces of dirt, and large impurities, to fall out at the other end without passing through. As the reels rotate, the wheat passes down in the annular space to the larger end of the outer reel, and the small impurities, in the shape of cockle, imperfect grains, and garlic, pass through the perforations in the outer reel and drop into the trough F, located beneath the same, from which trough they are removed by a spiral conveyer, G, rotated through a band, d, connected with a pulley on the reel-shaft. The wheat which passes down the annular space drops out at the end into a chute, H, and falls upon the set of shaker-sieves I, arranged to reciprocate longitudinally inside an inclosing-case, J.

These sieves may be made with different-sized holes or meshes, and as the wheat drops upon one end of the upper sieve e it passes down the incline toward the fan, which latter operates by suction. The wheat then falls upon the oppositely-inclined board f, and passes in the opposite direction until it drops again upon the lower sieve g, and is carried toward the fan until it reaches the end, when it drops off upon the board h and passes into the hopper o, and from thence into the box O, into which the elevator passes. As the wheat drops upon the upper sieve the latter is reciprocated by shaft L, which is turned by a band, i, connecting the main pulley upon the drive-shaft with the fan-pulley j, which band bears upon the pulley k of the said shaft L. This shaft is flattened at l, or provided with cams, which bear against the springs m that support the set of sieves, springs being used for this purpose to make the sieves more sensitive in their motion. The wheat being shaken upon the sieves, and a draft of air created at the same time toward the fan by the suction of the same, the heavier impurities, with oats, &c., pass over into the oat-box M, while the chaff and light particles eliminated are drawn through the conduits N on each side of the fan and discharged with the current of air at n. As the clean grain passes into box O an elevator, P, takes it, carries it up, and delivers it into the bag contained in the bag-holder Q, which consists simply of a vertical box with one side open, provided at the top with points, and having a tilting bottom. The elevator consists of a flexible band, p, which passes around pulleys r r, one of which is fastened to the drive-shaft. The buckets consist of triangular vessels s which slide into seats t, which are pieces of sheet metal attached to the flexible band and bent down at the top so as to hold the upper part of the bucket, and curved upwardly at the bottom so as to receive and support the wedge-shaped end of the buckets, which latter are also provided each with a bail, z, which is tied to the curved lower end to hold it securely in place. R R' are detachable tops or covers to the casing J, which may be removed for changing or repairing the sieves, one of which covers is provided with a glass window for inspecting the interior without removing the covers.

Having thus described my invention, what I claim as new, is—

The inner reel D and the outer reel D', located concentrically upon the same shaft, in combination with the trough F and spiral conveyer G, adapted to carry away the impurities passing through reel D', and the subjacent case J connected with the annular space between reels D D' by means of the chute H, and containing a suction fan and a set of shaker-sieves, as and for the purpose described.

WILLIAM EDRIS.

Witnesses:
    JOEL WARE,
    J. G. GRAY.